US005666039A

United States Patent [19]

Odaohara et al.

[11] Patent Number: 5,666,039
[45] Date of Patent: Sep. 9, 1997

[54] CHARGE REQUESTING BATTERY PACK AND CHARGE-REQUEST CONTROLLED CHARGER

[75] Inventors: Shigefumi Odaohara, Yamato; Arimasa Naitoh, Fujisawa; Toshitsugu Mito, Atsugi, all of Japan

[73] Assignee: International Business Machines Corporation, Armonk, N.Y.

[21] Appl. No.: 278,743

[22] Filed: Jul. 22, 1994

[30] Foreign Application Priority Data

Jul. 26, 1993 [JP] Japan .................... 5-184098

[51] Int. Cl.⁶ .................... H01M 10/46
[52] U.S. Cl. .................... 320/5; 320/35; 320/39
[58] Field of Search .................... 320/15, 5, 21, 320/30, 35, 36, 39, 40, 48

[56] References Cited

U.S. PATENT DOCUMENTS

| | | | |
|---|---|---|---|
| 4,396,880 | 8/1983 | Windebank | 320/21 |
| 4,737,702 | 4/1988 | Koenck | 370/40 |
| 4,849,682 | 7/1989 | Bauer et al. | 320/15 |
| 4,965,738 | 10/1990 | Bauer et al. | 320/39 X |

*Primary Examiner*—Edward Tso

[57] ABSTRACT

An invention to effect charging for a battery pack at the suitable time irrespective of the kind of an installed battery pack. A battery pack detects voltage, electric current, and temperature of an accommodated battery main body. When it is determined that charging for the battery main body is required, the battery pack outputs a charge request signal. Further, when it is determined that the battery main body has been brought into a full-charged state, the battery pack stops outputting of the charge request signal. When the charge request signal is inputted from the battery pack, the charge controller causes a direct current voltage supplied from an AC/DC adapter to be supplied for the battery pack, so as to start charging the battery main body of the battery pack. Further, when the continued inputting of the charge request signal is stopped, and the charging for the battery main body is stopped.

8 Claims, 7 Drawing Sheets

FIG. 5

CHARGE REQUESTING BATTERY PACK AND CHARGE-REQUEST CONTROLLED CHARGER

BACKGROUND OF THE INVENTION

1. Field of the Invention

The present invention relates to a battery pack and an electrical/electronic device, and particularly to a battery pack having a charge request function and a charge-stop request function, and an electrical/electronic device having a function for charging an installed battery pack.

2. Description of the Prior Art

In recent years, portable computers such as a personal computer of a notebook type, which is formed into a small-sized and lightweight device in consideration of portability, have become widespread. Most of these kinds of portable computers enable installation of a packaged battery (hereinafter referred to as a battery pack) in the portable computer such that the portable computer can operate even in a place where a public-supplied power source is not available. A battery pack installed in this type of portable computer can be charged while the portable computer is connected to a public-supplied power source or the like such that electric power from the public-supplied power source is being supplied to the battery pack via an AC/DC adapter or the like.

This charging for a battery pack is controlled by a charge controller provided within the portable computer. The charge controller accumulates a discharge current of the battery pack. When it is determined that the remaining capacity of the battery pack is at or below a predetermined value, the charge controller starts charging the battery pack. Further, during charging the charge controller accumulates a charging current for the battery pack. When it is determined that the battery pack is brought into a full-charged state, the charge controller stops charging the battery pack. The charged battery pack supplies electric power for the main body of the portable computer when the portable computer is disconnected from a public-supplied power source or the like.

Further, in relation to the foregoing, U.S. Pat. No. 4,965,738 discloses that sensors, which detect the magnitude of an electric current flowing in a battery and the temperature of the battery, are provided in a battery pack and that a microprocessor is provided which outputs electric current and temperature data in accordance with a request from a battery charger corresponding to the above-described portable computer. In a charge controller of the battery charger, a charge-start time and a charge-stop time are determined on the basis of inputted electric current data, temperature data, or the like.

However, in the above-described charge controlling system, for example, when the battery pack is replaced by another one, the remaining capacity of the newly inserted battery pack cannot be detected because data concerning this new battery pack has not been accumulated in the charge controller. Another drawback exists such that in cases when a power source of the portable computer is turned off and when an AC adapter is disconnected from the portable computer, data concerning the battery pack is lost unless a backup of the memory which stores data concerning the battery pack in the charge controller is effected. For this reason replacement of a battery pack, power-on of a computer, connection of an AC/DC adapter, or the like is conventionally utilized as a trigger, so as to automatically start charging for a battery pack. Thus, even when a battery pack is replaced for another battery pack, charging for the newly inserted battery pack is effected, thereby overcharging the newly inserted battery pack.

Further, the criteria for judging whether or not a battery main body in the battery pack has been brought into a full-charged state, i.e., whether or not charging for the battery pack has been completed, vary according to the manufacturer of the battery pack, the kind of cell used in the battery main body, the capacity of the battery pack, and the like. In relation to the above-described charge control, the charge controller cannot detect the criteria for judging whether or not charging for the installed battery pack has been finished. Accordingly, there exists a drawback in that, when a battery pack, having criteria different from those of a standard battery pack which were set when a portable computer was designed, is installed in the portable computer, charging for this installed battery pack cannot be stopped at the suitable time.

SUMMARY OF THE INVENTION

In view of the aforementioned facts, it is an object of the present invention to provide a battery pack which can prevent a battery main body from being overcharged.

It is another object of the present invention to provide an electrical/electronic device which can effect charging for a battery pack irrespective of the kind of installed battery pack, or the like.

In order to achieve the above-described objects, a battery pack is constructed so as to comprise: a battery main body; detecting means for detecting a physical quantity which represents the state of the battery main body; and outputting means which outputs a charge request when it is determined that charging for the battery main body is required based on the physical quantity representing the state of the battery main body detected by the detecting means, and outputs a charge-stop request when it is determined that the battery main body is brought into a full-charged state or a state close thereto on the basis of said physical quantity.

An electrical/electronic device in which the battery pack is installed, comprises charge controlling means which starts charging a battery main body of the installed battery pack when a charge request is inputted from the battery pack, and which stops charging the battery main body when a charge-stop request is inputted from the battery pack.

DESCRIPTION OF THE INVENTION

In general, the battery pack is provided with a detecting means for detecting a physical quantity which represents a state of the battery main body and the outputting means which outputs a charge request when it is determined that charging for the battery main body is required on the basis of the physical quantity representing the state of the battery main body, and which outputs a charge-stop request when it is determined that the battery main body is brought into a full-charged state or a state close thereto on the basis of the above-described physical quantity. Meanwhile, the physical quantity which represents the state of the battery main body, the criteria for judging a state in which charging for the battery main body is required, and the criteria for judging a full-charged state of the battery main body or a state close to full charge, respectively vary according to the manufacturers of the battery pack, the kind of cell used in the battery main body, the capacity of the battery pack, and the like. For this reason, the detecting means can detect the physical quantity, which varies according to the kind of cell of the battery main body, or the like, such as voltage, an electric current, and temperature of a battery, while the outputting means can determine each of the above-described states on the basis of the respective criterion which vary according to the manufacturers, i.e. the kind of cell, the capacity of the battery pack.

The battery pack is installed in (connected to) a device having a charging function, in which a battery charger is included to charge the battery. However, in the present invention, the above-described device can be constructed so as to start charging when the charge request is outputted from the battery pack and to stop charging when the charge-stop request is outputted therefrom. Accordingly, even though the device cannot determine the manufacturer of the battery pack, the kind of cell, the capacity of the battery pack, and the like, the device can start charging at the suitable time in accordance with a signal from the battery pack, and can also stop charging at the suitable time. Thus, overcharge of the battery main body can be prevented.

The electrical/electronic device, in which the battery pack is installed, is provided with the charge controlling means which starts charging the battery main body of the installed battery pack when the charge request is inputted from the battery pack, and which stops charging the battery main body when the charge-stop request is inputted from the battery pack. As described above, the battery pack outputs the charge request when it is determined that charging for the battery main body is required, and outputs the charge-stop request when it is determined that the battery main body has been brought into a full-charged state or a state close thereto.

For this reason, the charge controlling means need not determine the manufacturer of the battery pack, the kind of cell, the capacity of the battery pack, and the like, and can start charging at the suitable time in accordance with the signal from the battery pack, and can also stop charging at the suitable time. Accordingly, even though a battery pack, for example, having a different kind of cell of the battery main body, is installed in the electrical/electronic device, it is possible to effect charging for the installed battery pack at the suitable time irrespective of the kind of installed battery pack only if the installed battery pack outputs the signal as described above.

Referring now to the accompanying drawings, a detailed description will be given of the embodiments of the present invention. It should be noted that, in the following, the embodiments will be described using numerical values which cause no obstruction to the present invention, but the present invention is not limited to the numerical values described later.

Figure 1:
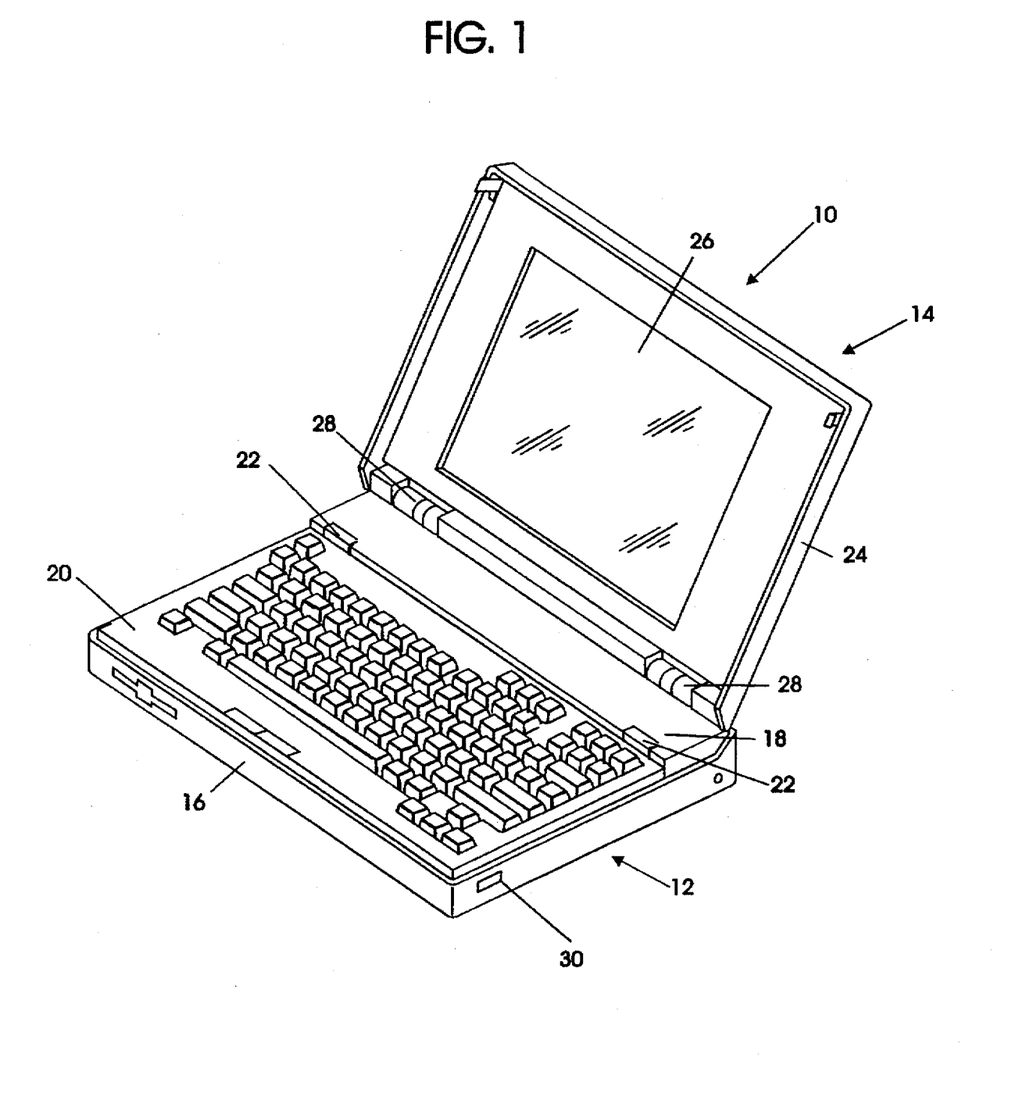
FIG. 1 is a perspective view illustrating an exterior of a personal computer as an electrical/electronic device according to the present invention.

FIG. 1 illustrates a notebook-type personal computer 10 as an electrical/electronic device of the present invention. The personal computer 10 is provided with a thin main body 12 and a cover 14 provided so as to freely open and close with respect to the main body 12. The cover 14 includes a shallow (double-bottomed) case 24. At a lower end portion of the case 24, a pair of protrusions 28 each being formed into a cylindrical shape is integrally formed in the case 24. The pair of protrusions 28 is rotatably supported on the main body 12, so that the cover 14 is connected to the main body 12 in a hinged manner. Thus, the cover 14 is adapted to rotate around the pair of protrusions 28. The case 24 is provided with a liquid crystal display 26 in the center of an opened side, namely, a back side, of the cover 14.

Meanwhile, the main body 12 includes a shallow case 16. A supporting plate 18 having a predetermined width dimension is mounted to the case 16 so as to cover an innermost portion of an upper opening of the case 16. Further, a keyboard 20 is mounted at an operator's side of the upper opening of the case 16. A pair of protrusions 22, each being formed into a tongue-like shape, is integrally formed in an innermost end portion of the keyboard 20. The pair of protrusions 22 is supported on the supporting plate 18 at an end portion thereof at an operator's side, thereby causing the keyboard 20 to be connected to the supporting plate 18 in a hinged manner. As a result, the keyboard 20 can rotate around the pair of protrusions 22. It should be noted that the aforementioned opening/closing operation of the cover 14 with respect to the main body 12 and opening/closing operation of the keyboard 20 with respect to the case 16 of the main body 12 are respectively effected by effecting a two-step operation of an opening/closing operating portion 30 provided at a lateral-side portion of the case 16.

Figure 2:
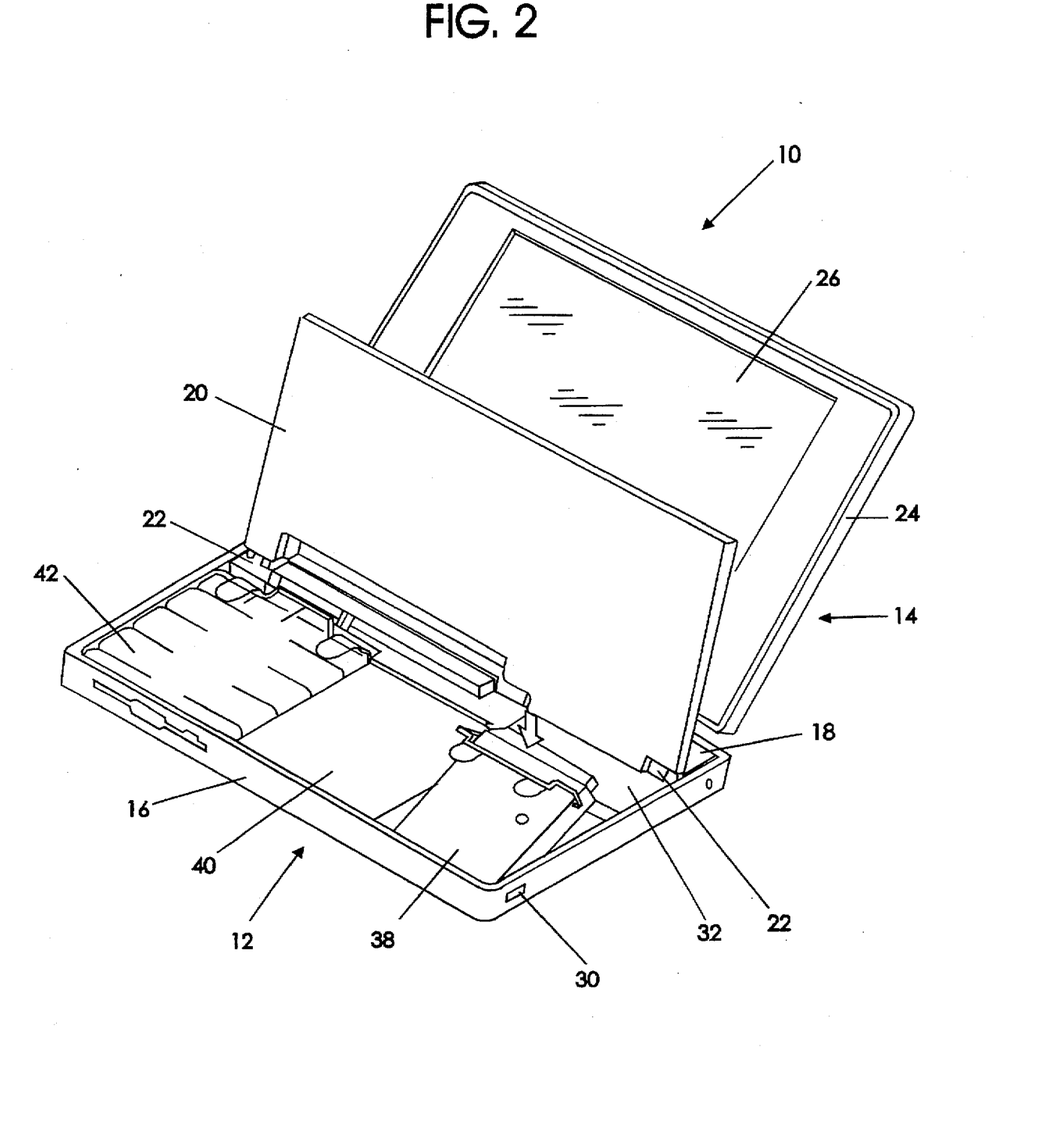
FIG. 2 is a perspective view illustrating a state in which a keyboard of the personal computer is opened and an installed battery pack is exposed to the outside.

As illustrated in FIG. 2, a partition wall 32, formed by a thin-walled metal plate bent into a predetermined shape, is disposed on an inner side within the case 16 of the main body 12. Inside the partition wall 32, an internal circuit of the personal computer 10 (described later) in which the system main body is included, is accommodated. A space for accommodating an HDD (Hard Disk Drive) pack 38, battery pack 40, and FDD (Floppy-Disk Drive) pack 42 is formed within the case 16 at an operator's side of the partition wall 32. This HDD pack 38, battery pack 40, and FDD pack 42 are respectively adapted so as to be freely attachable to and removable from the main body 12. In a state in which these packs are installed within the main body as illustrated in FIG. 2 (however, FIG. 2 illustrates a state in which the battery pack 40 and FDD pack 42 are installed in the main body 12), each pack is electrically connected to the system main body via an unillustrated connector.

Figure 3:
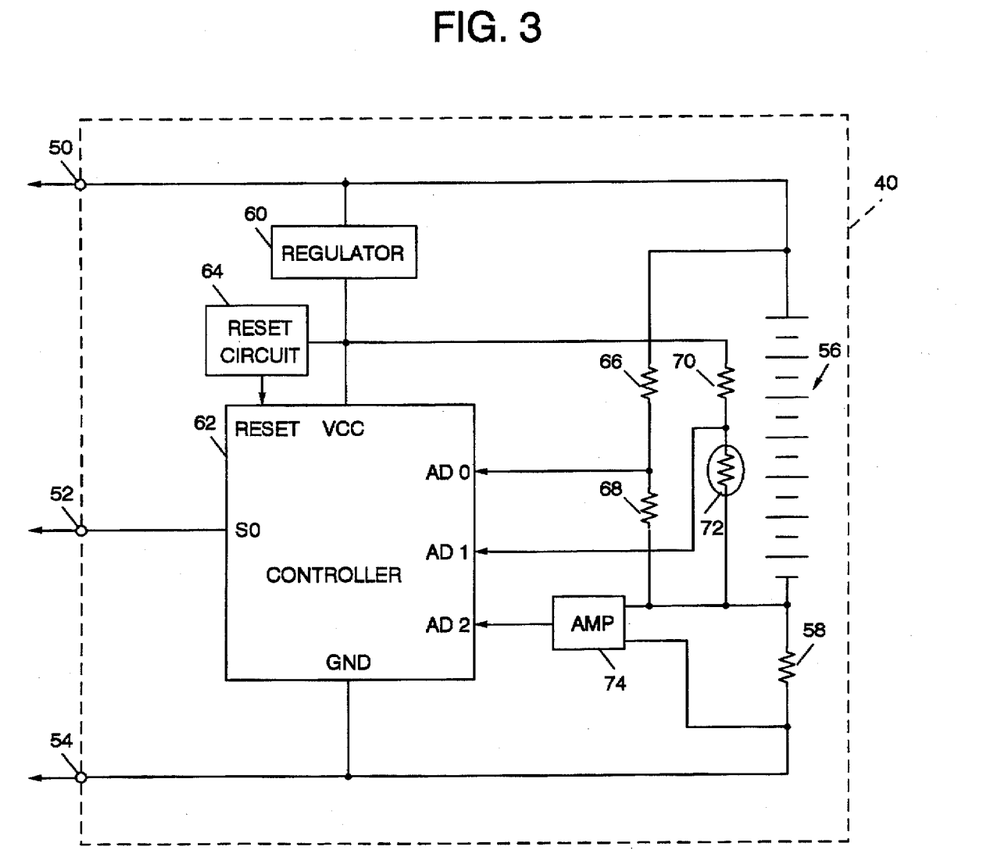
FIG. 3 is a block diagram illustrating a schematic configuration of an internal portion of the battery pack.

As illustrated in FIG. 3, the battery pack 40 includes terminals 50, 52 and 54. These terminals 50, 52 and 54 are exposed to the outside of the battery pack 40. In a state in which the battery pack 40 is installed in the main body 12, the terminals 50, 52 and 54 are respectively connected to terminals (described later) provided within the main body 12. The terminal 50 is connected to a plus terminal of a battery main body 56. The terminal 54 is connected to a minus terminal of the battery main body 56 via a micro-resistance 58 (for example, 20 mΩ or thereabouts) for detecting an electric current. It should be noted that, in this embodiment, a battery (secondary battery), formed by a plurality of unit cells of nickel metal hydride serially connected to each other, is used as the battery main body 56.

Further, the terminal 50 is connected to a feeding terminal VCC of a controller 62 via a regulator 60, while the terminal 54 is connected to a grounding terminal GND of the controller 62. The controller 62 comprises a CPU, ROM, RAM, input/output port, and the like, and is adapted so as to operate when a voltage of a predetermined level is supplied for the controller 62. The regulator 60 converts the voltage between terminals 50, 54 to a constant voltage for operating the controller 62 and then supplies the constant voltage for the controller 62. Meanwhile, a signal output terminal SO of the controller 62 is connected to the terminal 52. A charge request signal and various data are serially outputted from the signal output terminal SO, as described later.

Further, an input terminal of a reset circuit 64 is connected to the feeding terminal VCC of the controller 62, while an output terminal of the reset circuit 64 is connected to a reset terminal RESET of the controller 62. The reset circuit 64 outputs a reset signal to the reset terminal RESET when the voltage supplied for the feeding terminal VCC increases so as to be greater than or equal to a predetermined level. As a result, the controller 62 is reset in an initial state and then starts its operation.

One end of a resistance 66 is connected to a plus terminal of the battery main body 56, while the other end thereof is connected to one end of a resistance 68. The other end of the resistance 68 is connected to a minus terminal of the battery main body 56. One point between the resistance 66 and the resistance 68 is connected to a signal input terminal AD0 of the controller 62. Accordingly, a signal of the voltage level corresponding to the voltage of the battery main body 56 which is divided by the resistances 66, 68 is supplied for the signal input terminal AD0. The controller 62 is provided with an unillustrated analog/digital converter (hereinafter referred to as an A/D converter). Thus, the controller 62 converts a signal supplied from the signal input terminal AD0 to digital data, whose value corresponds to the voltage level of the above-described signal, by the A/D converter, and takes in this converted digital data as voltage data which represents the voltage of a battery.

Further, one end of a resistance 70 is connected to the feeding terminal VCC of the controller 62, and the other end thereof is connected to one end of a thermistor 72 disposed in the vicinity of the battery main body 56. The other end of the thermistor 72 is connected to a minus terminal of the battery main body 56. On point between the resistance 70 and the thermistor 72 is connected to a signal input terminal AD1 of the controller 62. Since a resistance value of the thermistor 72 varies according to an ambient temperature, a signal whose voltage level corresponds to the temperature of the battery main body 56 is supplied for the signal input terminal AD1. The controller 62 causes a signal supplied from the signal input terminal AD1 to be converted to digital data by the (unillustrated) A/D converter, and takes in this converted digital data as temperature data which represents the temperature of the battery main body 56.

Further, both ends of the resistance 58 are connected to respective input ends of an amplifier 74. An output terminal of the amplifier 74 is connected to a signal input terminal AD2 of the controller 62. Accordingly, a signal whose voltage level corresponds to the magnitude of an electric current flowing through the resistance 58, i.e., the magnitude of an electric current flowing in the battery main body 56, is supplied for the signal input terminal AD2. The controller 62 causes the signal supplied from the signal input terminal AD2 to be converted to digital data by the unillustrated A/D converter, and takes in this converted digital data as electric current data which represents the magnitude of the electric current flowing in the battery main body 56.

Figure 4:
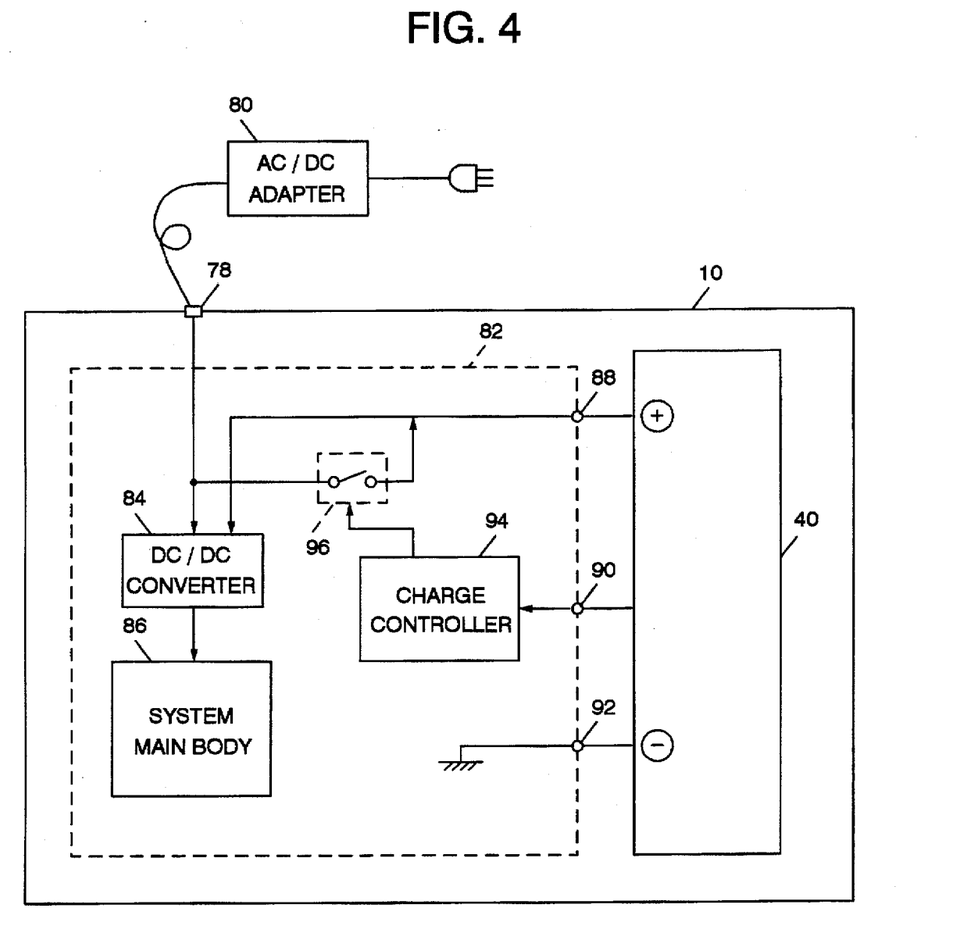
FIG. 4 is a block diagram illustrating a schematic configuration of an internal circuit of the personal computer.

Meanwhile, as illustrated in FIG. 4, an internal circuit 82 of the personal computer 10 in which the battery pack 40 is installed includes terminals 88, 90 and 92. In a state in which the battery pack 40 is installed in the personal computer 10, the terminals 88, 90 and 92 are connected to terminals 50, 52 and 54 of the battery pack 40, respectively. The terminal 92 is grounded, while the terminal 88 is connected to an input terminal of a DC/DC converter 84. Further, the personal computer 10 is provided with a connector 78 serving as a power source terminal. The connector 78 is connected to a public-supplied power source via an AC/DC adapter 80 serving as a feeding means, so that a direct current voltage is supplied from the public-supplied power source via the AC/DC adapter 80. The connector 78 is also connected to the DC/DC converter 84.

An output terminal of the DC/DC converter 84 is connected to the system main body 86. The system main body 86 comprises a CPU, ROM, RAM, input/output port, and the like, and is adapted so as to operate when a voltage of a predetermined level is supplied. When the AC/DC adapter 80 is connected to the connector 78, the DC/DC converter 84 converts the direct current voltage supplied from the AC/DC adapter 80 to the above-described voltage of a predetermined level, and supplies this converted voltage for the system main body 86. Further, when the AC/DC adapter 80 is not connected to the connector 78 and the battery pack 40 in a full-charged state is installed in the personal computer 10, the DC/DC converter 84 converts the direct current voltage supplied from the battery pack 40 to the above-described voltage of a predetermined level and supplies this converted voltage for the system main body 86. This causes the system main body 86 to operate.

Further, the connector 78 is connected to one end of a switching circuit 96, and the other end of the switching circuit 96 is connected to a terminal 88. An output terminal of a charge controller 94 whose input terminal is connected to a terminal 90 is also connected to the switching circuit 96. In FIG. 4, the switching circuit 96 is typically shown as a switch, but actually, comprises a switching element such as an FET. The charge controller 94 determines whether or not charging for the battery pack 40 is effected on the basis of a charge request signal and various data, which are inputted from the controller 62 of the battery pack 40 via the terminal 90. When charging is effected, the switching circuit 96 is turned on. Accordingly, the direct current voltage supplied from the AC/DC adapter 80 is supplied for the battery pack 40 so that the battery main body 56 of the battery pack 40 is charged.

Figure 5:
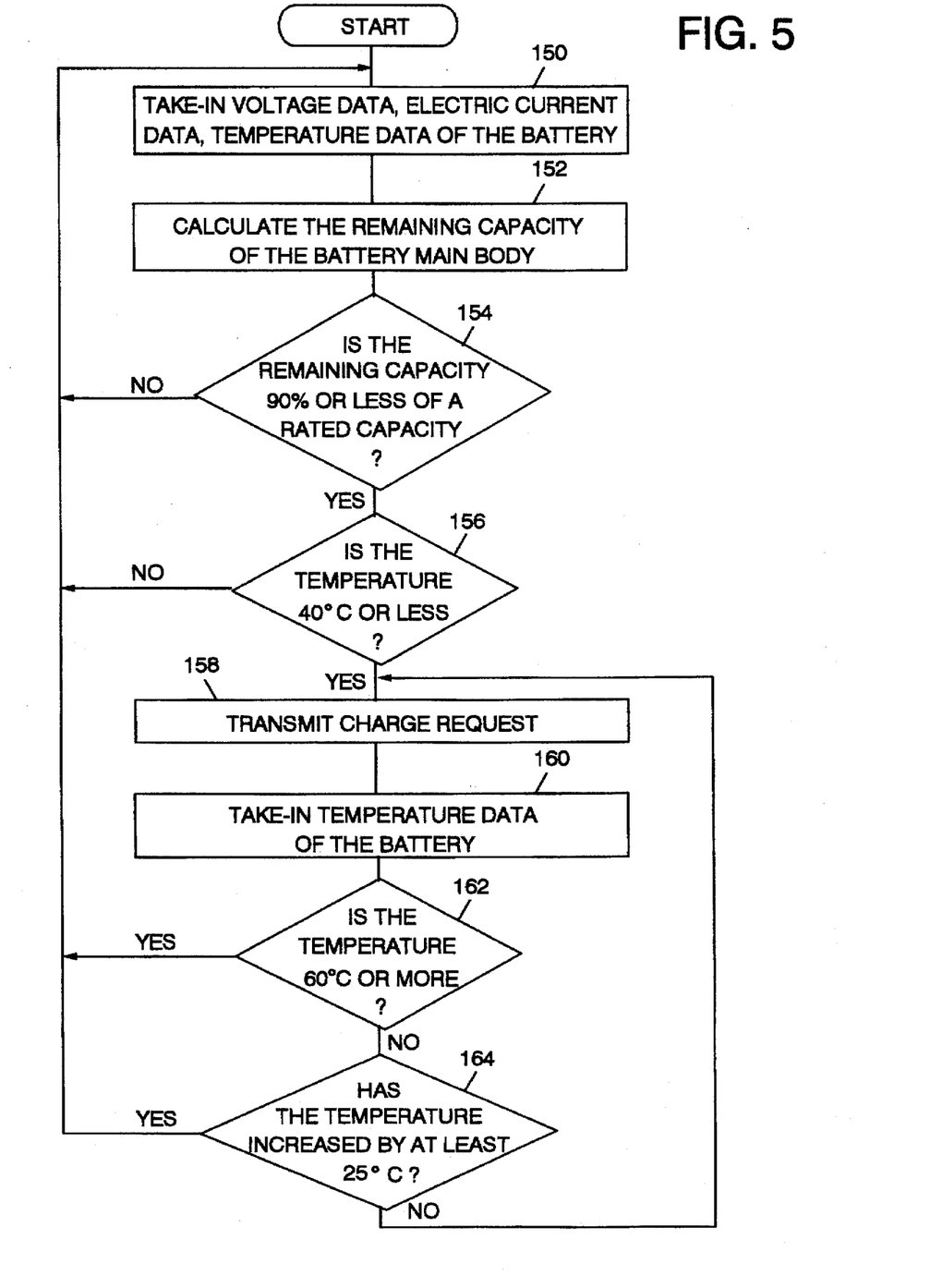
FIG. 5 is a flow chart illustrating a process to be performed in a controller of the battery pack.

Next, an operation of the first embodiment will be described hereinafter. First, an operation to be effected in the controller 62 of the battery pack 40 will be explained. When the battery main body 56 is charged, the voltage between the terminals 50, 54 increases so as to be a predetermined value or more. For this reason, the voltage supplied for the feeding terminal VCC increases so as to be a predetermined level or more, and then a reset signal is inputted from the reset circuit 64 to the controller 62. As a result, the process illustrated in a flowchart of FIG. 5 is performed in the controller 62. Meanwhile, the process is performed during a period when the voltage of the battery main body 56, which is represented with voltage data, is larger than an allowable value, but when the battery main body 56 is not charged for a long period of time and the voltage of the battery main body 56 decreases to be the allowable value or less by discharge of the battery main body 56, the operation of the controller 62 itself is suspended (namely, shutdown) until the voltage of the battery main body 56 becomes larger than the allowable value by effecting trickle charge of the battery main body 56.

In Step 150, voltage data, electric current data and temperature data are respectively taken in. These data are transmitted to the charge controller 94 of the personal computer 10 when the battery pack 40 is installed in the personal computer 10. In step 152, the remaining capacity of battery main body 56 is calculated on the basis of the above-described taken-in data. This calculation of the remaining capacity is performed by subtracting the value obtained by integrating a discharge current flowing in the battery main body 56, from the capacity of the battery main body 56 and further by subtracting the value of a self-discharge current of the battery main body 56 from the remaining capacity thereof. Since the magnitude of the self-discharge current is dependent upon the temperature of the battery main body 56, if only the relation between the temperature and the magnitude of the self-discharge current is previously stored in a table or the like, the magnitude of the self-discharge current can be obtained on the basis of the table and the temperature data.

Step 154 determines whether or not the remaining capacity of the battery main body 56 is at least 90% of a rated capacity thereof. The rated capacity is the capacity of the battery main body 56 obtained when the battery main body 56 is fully charged. Thus, the rated capacity can be obtained by causing the battery main body 56 to be fully charged after the battery main body 56 is completely discharged, and by integrating the discharge current at the time of discharging. The rated capacity may be stored in the controller 62 as a fixed value, or the value obtained by an actual observation using the controller 62 may be used for the rated capacity. When the decision of step 154 is no, the process returns to step 150. Steps 150 through 154 are repeated. Thus, in steps 150 through 154, the decrease in remaining capacity of the battery main body 56 is observed.

When a decision of step 154 is yes, step 156 determines whether or not the temperature of the battery main body 56 is 40° C. or less. When a decision of step 156 is no, the process returns to step 150. Meanwhile, if the decision of step 156 is yes, in step 158, a charge request signal is outputted to the personal computer 10. The charge request signal is inputted to the charge controller 94 via terminals 52, 90. When the charge request signal is inputted to the charge controller 94, the charge controller 94 starts charging for the battery pack 40, which will be described later in details.

Next, in step 160, the temperature data is again taken in. Step 162 determines whether or not the temperature of the battery main body 56 has increased so as to be 60° C. or more. When a decision of step 162 is no, in step 164, it is determined, after outputting of the charge request signal starts, whether or not the temperature of the battery main body 56 has increased by at least 25° C. As described above, in this embodiment, a battery of nickel metal hydride is used as the battery main body 56. It is known that the temperature of the battery of nickel metal hydride increases as charging for the battery advances. Step 162 observes the temperature of the battery main body 56 such that the temperature thereof does not increase excessively. Step 164 observes the variation of temperature of the battery main body 56 so as to determine whether or not the battery main body has been brought into a full-charged state or a state close to full charge.

When both decisions of steps 162, 164 are no, the process returns to step 158, in which the charge request signal is again outputted. When the temperature of the battery main body 56 increases so as to be at least 60° C., or when it increases by at least 25° C. after charging starts, either decision of step 162 or step 164 is proved to be yes, then the process returns to step 150. Accordingly, outputting of the charge request signal is stopped. This operation corresponds to that, in this embodiment, the charge request signal is outputted.

The temperature of the battery main body 56 at the time of starting charging is not constant. However, when a decision of step 156 is yes, namely, only when the temperature of the battery main body 56 is 40° C. or less, the charge request signal is outputted to start charging. Accordingly, the variation of temperature of the battery main body 56 after charging starts is at least 20° C. (60° C.–40° C.). When either decision of step 162 or step 164 is yes, the battery main body 56 is fully charged or is brought into a state close to full charge.

Figure 6:
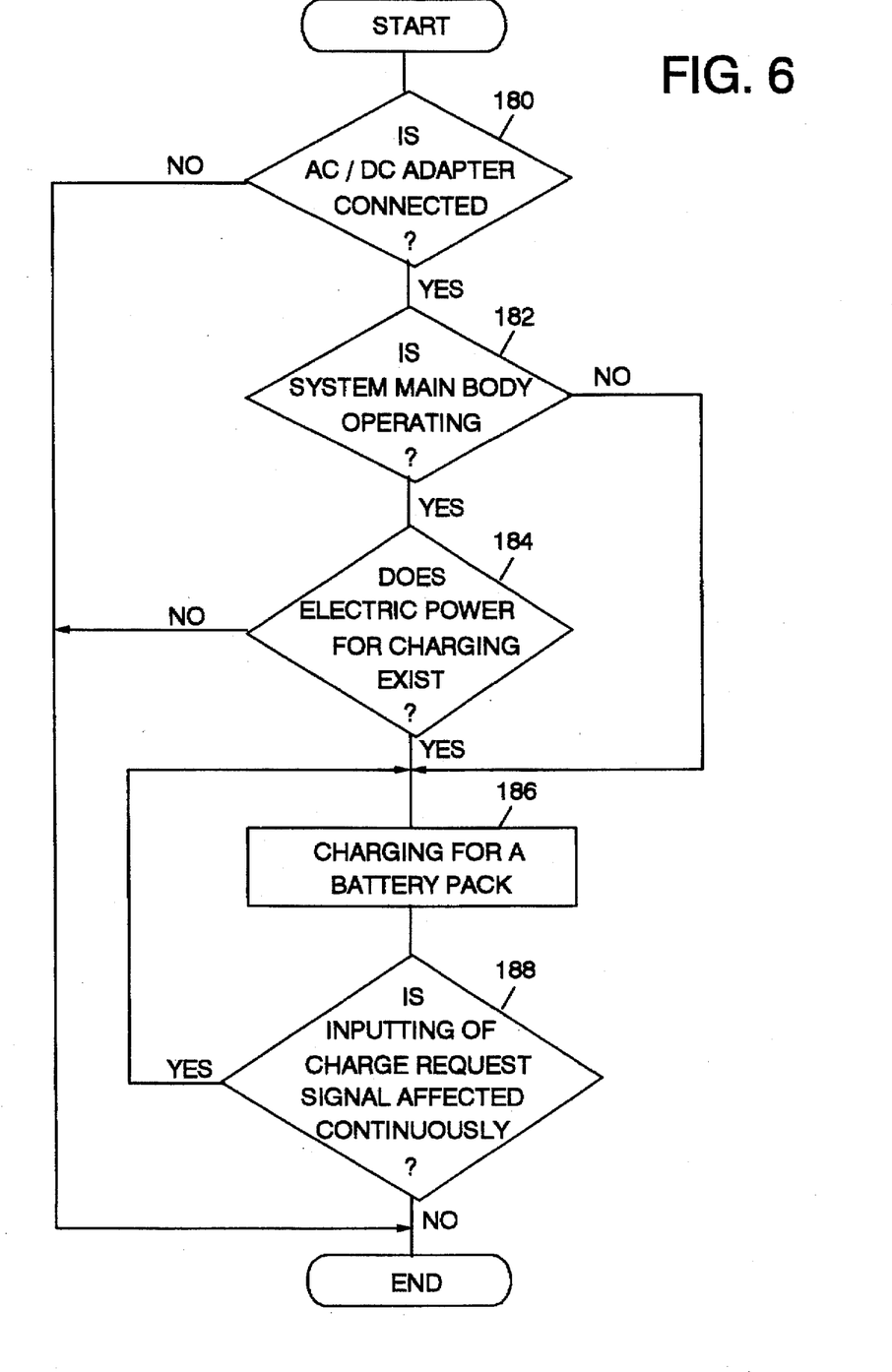
FIG. 6 is a flow chart illustrating a process to be performed in a charge controller according to a first embodiment of the present invention.

Next, a process in the charge controller 94 will be described below with reference to a flowchart illustrated in FIG. 6. It should be noted that the flowchart illustrated in FIG. 6 is implemented when the charge request signal is inputted from the battery pack 40 which is installed in the personal computer 10. Step 180 determines whether or not the AC/DC adapter 80 is connected to the personal computer 10. When a decision of Step 180 is no, charging for the battery pack 40 cannot be effected, so the process ends.

Meanwhile, in a state in which the AC/DC adapter 80 is not connected to the personal computer 10, the personal computer 10 operates while consuming an electric energy accumulated in the battery-main body 56 of the battery pack 40. Accordingly, when the state in which the AC/DC adapter 80 is not connected to the personal computer 10 continues, the remaining capacity of the battery main body 56 gradually decreases and the voltage thereof also decreases. When the AC/DC adapter 80 is not connected to the personal computer 10, the charge controller 94 observes the value of voltage data inputted from the battery pack 40. When the value of voltage data decreases to a predetermined value or less, the charge controller 94 causes the system main body 86 (or the personal computer 10) to proceed to a low-consumption power mode (note that the predetermined value is larger than the above-described allowable value). The low-consumption power mode causes an operation of the liquid crystal display 26 to stop, and stops feeding electric power to each circuit from which memory of the system main body 86 is excluded. The low-consumption power mode can be released when the AC/DC adapter 80 is connected to the personal computer 10 or when the battery pack 40 is replaced for another battery pack (having a full capacity) in a full-charged state or a state close to full charge, so that the system main body 86 returns to a state before proceeding to the low-consumption power mode.

On the other hand, when the AC/DC adapter 80 is connected to the personal computer 10, the decision of step 180 is proved to be yes. In step 182, it is determined whether or not the system main body 86 is operating. When the system main body 86 does not operate, the process proceeds to step 186. Further, when the system main body 86 is operating, the decision of the step 182 is proved to be yes, step 184 determines whether or not electric power is available to charge the battery pack 40. When a large quantity of electric power is temporarily consumed in the system main body 86, the decision of the step 184 is no, and the process temporarily ends. When, for example, a consumed power of the system main body 86 is small, the decision of step 184 is yes, and the process proceeds to step 186.

In step 186, the switching circuit 96 is turned on. Accordingly, the direct current voltage supplied from the AC/DC adapter 80 via the connector 78 is supplied for the battery pack 40 via the terminals 88, 92, so that the battery main body 56 of the battery pack 40 is charged. In the next step 188, it is determined whether or not inputting of the charge request signal from the battery pack 40 is effected continuously. When inputting of the charge request signal is effected continuously, the process returns to step 186, in which charging for the battery main body 56 of the battery pack 40 is effected continuously.

When the battery main body 56 is fully charged or is brought to a state close to full charge, inputting of the charge request signal from the battery pack 40 is stopped. Accordingly, the decision of the step 188 is no and it is determined that charging for the battery main body 56 has completed and the charge-stop request has been inputted. As a result, the switching circuit 96 is turned off so as to stop charging for the battery main body 56 and the process ends.

In this manner the charge controller 94 starts charging when the charge request signal is inputted from the battery pack 40 and stops charging when the continued inputting of the charge request signal is stopped irrespective of the manufacturer of the battery pack the kind of cell used in the battery main body 56, the capacity of the battery pack 40, and the like. Accordingly, even when the battery pack 40, for example, having a different kind of cell of the battery main body, is installed in the personal computer 10, the charge controller 94 can start charging and stop charging at the suitable time on the basis of the charge request signal inputted from the installed battery pack 40. For this reason, even when, for example, a battery pack for the personal computer 10 is newly developed, the above-described battery pack can be used without any modification of the operation in the charge controller 94.

A second embodiment of the present invention will be described below. It should be noted that the same members as those of the first embodiment will be denoted by the same reference numerals, and a description thereof will be omitted.

In the second embodiment, when the battery pack 40 is installed in the personal computer 10, the controller 62 of the battery pack 40 outputs data relating to a rated value of the battery main body 56, for example, data such as magnitude of a charging current, to the charge controller 94. The charge controller 94 stores the above-described data outputted from the controller 62 of the battery pack 40 in memory or the like.

Figure 7:
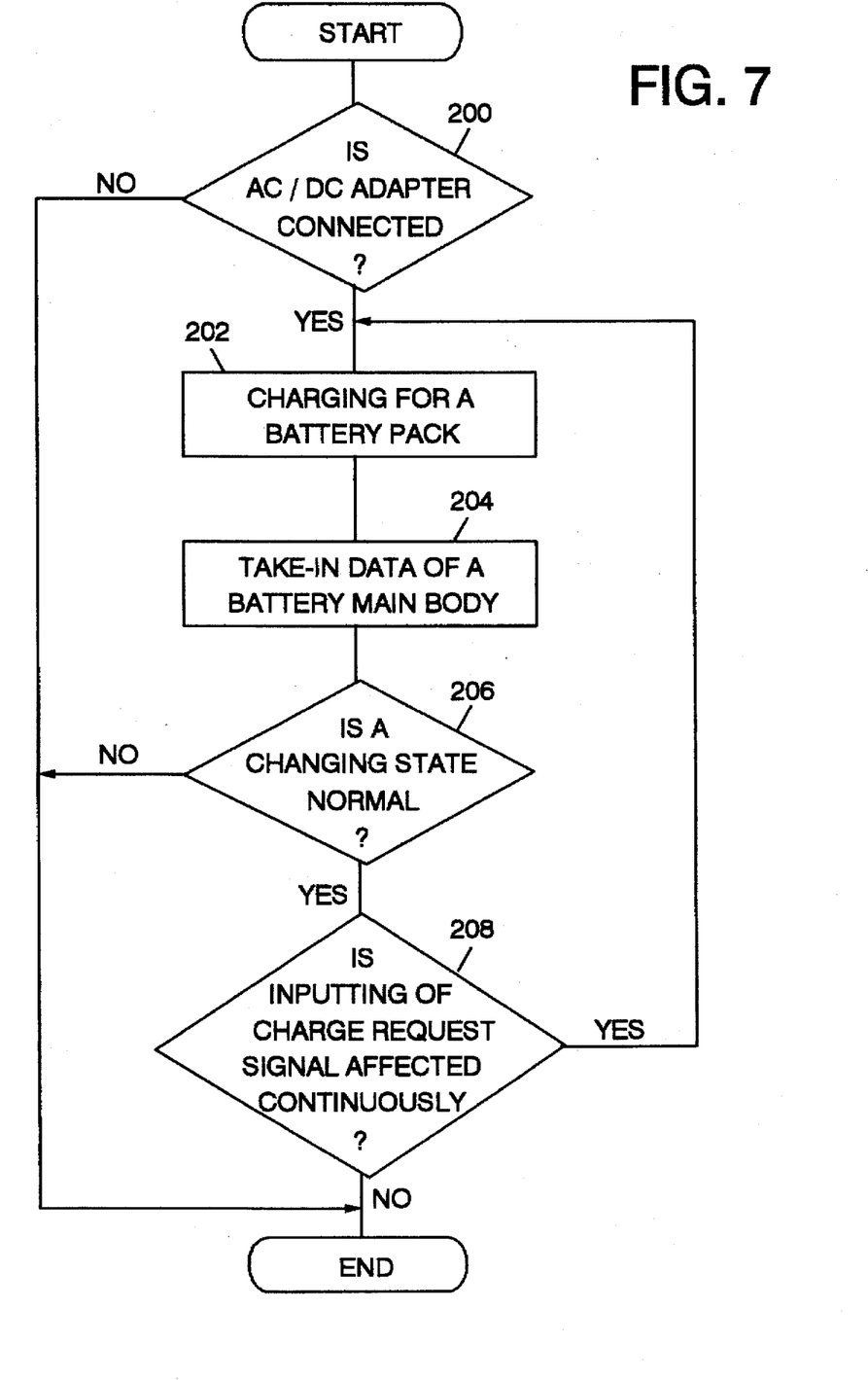
FIG. 7 is a flow chart illustrating a process to be performed in a charge controller according to a second embodiment of the present invention.

A process of the second embodiment is performed in the charge controller 94 when the charge request signal is inputted from the controller of the battery pack 40 to the charge controller 94, will be described below with reference to a flow chart illustrated in FIG. 7. In step 200, in the same way as the first embodiment, it is determined whether or not the AC/DC adapter 80 is connected to the personal computer 10. When the decision of the step 200 is yes, the switching circuit 96 is turned on in step 202, in which the direct current voltage supplied from the AC/DC adapter 80 via the connector 78 is supplied for the battery pack 40, that charging for the battery main body 56 of the battery pack 40 is effected.

In the next step 204, data relating to the battery main body 56, namely, voltage data, electric current data, temperature data and the like, are taken in from the controller 62 of the battery pack 40. Step 206 determines whether or not a state in which the battery main body 56 is charged is normal on the basis of the data taken in from the battery pack 40. When, for example, a large quantity of electric power is temporarily consumed in the system main body 86, the electric current (namely, charging current) flowing in the battery main body 56 becomes small. When, for example, the charging current is lower than a rated value of the charging current of the battery main body 56, it is difficult to normally perform charging and it is not possible to correctly determine, in the battery pack. 40, the full-charged state of the battery main body 56.

For this reason, when a decision of step 206 is no, charging for the battery main body 56 is interrupted and the process ends. Further, when a decision of step 206 is yes in step 208, it is determined whether or not inputting of the charge request signal is effected continuously. When a decision of step 208 is yes, the process returns to step 202, and steps 202 through 208 are repeated until the decision of either step 206 or step 208 is proved to be no. When the battery main body 56 is fully charged or is brought into a state close to full charge, inputting of the charge request signal from the battery pack 40 is stopped, so that the decision of step 208 is no and charging for the battery main body 56 is stopped.

In the above-described embodiments, when it is determined that charging for the battery main body 56 is required, the battery pack 40 continuously outputs the charge request signal, while when it is determined that the battery main body 56 has been fully charged or has been brought into a state close to full charge, the battery pack 40 stops outputting of the charge request signal. However, the present invention is not limited to the same, and the battery pack 40 may output the charge request signal only when it is determined that charging for the battery main body 56 is required and may output the charge-stop request signal when it is determined that the battery main body has been fully charged or has been brought into a state close to full charge.

Further, in the above-described embodiments, the controller 62 of the battery pack 40 serially outputs the charge request signal and various data in a serial fashion from the signal output terminal SO, but an exclusive terminal for outputting only the charge request signal may be provided.

In addition, in the above-described embodiments, the case in which a battery of nickel metal hydride is applied to the present invention has been described as an example. However, the present invention is not limited to the same, and may be applied to the case of using a nickel-cadmium battery (Ni—Cd battery), lithium ion battery and the like. In these cases, of course, determination to start charging and to finish charging in the controller 62 of the battery pack 40 varies according to a kind of cell. As an example, when the nickel-cadmium battery is used, it can be determined that charging for the battery is finished at the point of time when the voltage of the battery decreases slightly after it has increased.

Further, in the above-described embodiments, the case in which a personal computer is applied to the present invention as an electrical/electronic device has been described as an example. However, the present invention is not limited to the same, and may be applied to the case of using, as the electrical/electronic device, a battery charger for charging a battery pack, various cordless devices such as a portable telephone set, cordless telephone set, or an electronic device such as a word processor.

As described above, the battery pack has been constructed such that the battery pack is provided with the detecting means for detecting a physical quantity which represents the state of the battery main body, and the outputting means which outputs a charge request when it is determined that charging for said battery main body is needed on the basis of the detected physical quantity representing the state of said battery main body, and which outputs a charge-stop request when it is determined that said battery main body is brought into a full-charged state or a state close to full charge on the basis of the above-described physical quantity. The present invention attains an excellent effect in that overcharging of the battery main body can be prevented.

The electrical/electronic device has been constructed such that it is provided with the charge controlling means which starts charging the battery main body of the battery pack when a charge request is inputted from the installed battery pack and stops charging for the battery main body of the battery pack when the charge-stop request is inputted. The present invention attains an excellent effect in that charging for the battery pack can be performed at the suitable time irrespective of the kind of the installed battery pack, and the like.

What is claimed is:

1. A battery pack comprising:

a battery;

detecting means, coupled to said battery, for detecting charge remaining in the battery;

interpreting means, coupled to said detecting means, for determining when to start and stop charging of said battery based on information from said detecting means; and signalling means that output a charge request, when it is determined to start charging said battery, and output a charge-stop request, when it is determined to stop charging said battery.

2. The battery pack of claim 1, wherein said detecting means comprises:

means for detecting a temperature of said battery;

means for detecting a magnitude of current into said battery; and means for detecting a voltage across said battery.

3. The battery pack of claim 2, further comprising a reset means for resetting the interpreting means to an initial state when the battery charge reaches a predetermined state.

4. The battery pack of claim 1, wherein said battery comprises a plurality of individual batteries.

5. A charging device, comprising:

a connection for a battery pack;

charging means for charging a battery pack, said charging means connected to said connection to enable the charging means to charge a battery in said battery pack;

detecting means for detecting a charge request and a charge-stop request from the battery pack; and controlling means coupled to said charging means for starting said charging means when a charge request is detected and stopping said charging means when a charge-stop request is detected.

6. The charging device in claim 5 wherein said controlling means comprises a switch having at least first and second positions and wherein said controlling means starts charging by triggering said switch to the first position and stops charging by triggering the switch to the second position.

7. The charging device in claim 6, wherein said controlling means further comprises a means for accumulating charging current for transfer through said connection.

8. The charging device in claim 5, wherein said battery is removable.

* * * * *